Patented Apr. 7, 1931

1,799,816

UNITED STATES PATENT OFFICE

EDWARD SIDNEY HOLE, OF LONDON, ENGLAND

PROCESS OF MAKING CONDENSATION PRODUCTS

No Drawing. Application filed June 9, 1928, Serial No. 284,276, and in Great Britain June 20, 1927.

This invention relates to condensation products of the kind produced by the well known reaction between carbolic acid and formaldehyde in the presence of a small quantity of an alkali salt, and the object of the invention is to provide an improved product having valuable properties as a varnish or protective coating or impregnant and a method of preparing the improved product in a water soluble form for the purpose of facilitating its application as a coating or impregnant.

In one known process for the production of a condensation product of the character above referred to, carbolic acid and 40% formaldehyde are heated together with a small proportion of an alkali salt until, after the expulsion or evaporation of the water in the mixture, a resinified product is obtained which may be moulded into articles of different shapes or dissolved in suitable solvents such as alcohol or a mixture of alcohol and acetone.

It is also known already that by merely bringing the mixture to boiling point, cooling and then neutralizing the alkali with a suitable acid, for instance hydrochloric acid, the product of condensation remains dissolved in the water of the mixture as a thin solution which can be used for various purposes. It is further known that this water soluble product can be further concentrated by continued boiling.

According to my invention when the mixture is boiling to a desired degree of viscosity I add to the boiling mixture a quantity of cold or heated water and after cooling the mixture I add a further quantity of water containing a suitable salt of chromium in the requisite proportions. This process achieves the solubility of the product in any required degree of viscosity even approaching resinification in water, and the production in such product of special valuable characteristics by the addition of the chromium compound.

Not only does my invention by the use of water as sole or principal solvent effect a great economy as compared with the cost of alcohol and similar solvents, but a very important consequence is that no matter to what degree the product is diluted the residual product after evaporation of the solvent retains the degree of viscosity or approximation to resinification which it had before the addition of the solvent. It is thus possible by prolonged boiling to carry the product exactly as far towards solidification as desired and to complete the process later for instance in a heated press as rapidly or with as much delay as may be required for the purpose in view. The amount of water used as solvent while regulating the fluidity of the solution does not alter the viscosity of the residue but enables substances to be impregnated with the product in a finer state of distribution.

As a typical example I may take the constituents in the following proportions, viz:—

Carbolic acid (phenol) _____ 1 cwt.
Formaldehyde 40% _____ 1 cwt.
Potassium hydroxide (KOH) _____ 2½ lbs.

The mixture of these constituents is placed in a still and boiled for a period which depends upon the purpose for which the mixture is intended. When the mixture reaches the boiling point a visible seething appears and after this a period of 30 to 40 minutes continued boiling is sufficient to produce a product suitable for most purposes. The viscosity of the solution increases during the boiling at first slowly and then so rapidly that relatively fine adjustment of the period of boiling is necessary in order that the desired degree of viscosity may be obtained, for whereas after the boiling point is first reached a few minutes do not effect any noticeable change, in the later stages a single minute may visibly affect the viscosity of the product.

When the mixture has been boiled for the period requisite for the purpose in view so that the desired degree of viscosity has been reached, a quantity of cold water (about 72 lbs.) is added to the contents of the still and the resulting solution is then run through a cooling coil into a suitable receptacle.

It will be found that by adjusting the period of boiling to bring the mixture to the requisite degree of viscosity and then adding water as above described it is possible to produce a soluble product of any desired degree of viscosity even approaching resinification. No matter to what degree the solution is diluted, the residual product after evaporation of the solvent and suitable treatment of the alkaline condensing agent will retain the same degree of viscosity or approximation to resinification as it had before the addition of the solvent and will retain this condition until further condensed by heat treatment.

Instead of eliminating or simply neutralizing the alkaline condensing agent (which if not suitably treated would continue to operate even in the cold) I utilize this alkali as a basis on which to build a compound of chromium, the effect of which is to suspend the activity of the condensing agent rather than to neutralize it altogether, and at will it can be made again effective in the last and most important stage of resinification, reinforced by the action of the chromium and oxygen contained in the chromium compound which has been embodied in the product. The effect is that the finished product is endowed with remarkable strength and is produced with remarkable ease. When used as an impregnant a few minutes under pressure in a heated press will transform the product to the final hardened infusible form, and owing to the imparted quality of non-adhesion to similar material, the moulded and hardened product can be used as a die or matrix from which any required number of replicas of the original can be formed in the same material as that composing the matrix itself. It is only necessary for the matrix to be taken from the press and cooled and it is then ready for immediate use. It is helpful to accentuate the quality of non-adhesion if the surface be rubbed with a mixture of talcum powder and any suitable oil. Ordinary mineral oil or petroleum jelly answers excellently. When light or heat or both act upon the product after moisture has been expelled the chromium compound seems to reinforce the resumed activity of the condensing alkali, with which it is combined, and at the same time greatly increases the strength of the material which has been impregnated in addition to the effect it has upon the impregnant itself.

As a typical example of the employment of a compound of chromium, I may add to the cooled solution of phenol formaldehyde prepared as above described a mixture of 2–3 pounds of ammonium dichromate, 36 lbs. of cold or warm water and sufficient ammonium hydroxide to prevent precipitation. When the viscosity of the mixture is very high, alcohol, either alone or in combination with ammonium hydroxide, may be added to the mixture to ensure solubility.

Ammonium or calcium chromate, or copper, zinc, aluminium, strontium or many other chromates dissolved when necessary in a suitable quantity of chromic acid (chromium trioxide) may be used in place of ammonium dichromate, but I prefer ammonium dichromate because it is cheaper and more readily available than any of the other substances mentioned. It is also possible to use chromium in the form of chromium acetate or similar salts where the chromium has a basic instead of an acidic form. The resultant condensation product may be employed either by itself for various purposes or may be utilized for impregnating any suitable substance or adulterant by means of absorption or adsorption, such for instance as paper, paper pulp, wood flour, cellulose or other materials of a like nature. The effect of the chromium is not only to be considered in relation to the impregnant itself but also in relation to the combination of the impregnant and the impregnated matter, as in the case of many organic substances, e. g. cellulose, the presence of a chromium compound in the impregnant results in a remarkably strong product. This is particularly the case when a copper chromate plus ammonium (or copper hydroxide plus ammonium chromate plus excess of ammonia) is used in conjunction with cellulose.

In order to retain and increase the water solubility of the product, especially in cases where the viscosity is very high, alcohol or ammonium hydroxide or a mixture of both in varying proportions may be added to the mixture, hot or cold water also being added as before mentioned and as directed in the specification of my co-pending patent application No. 194,522, filed on May 26, 1927, issued Aug. 27, 1929, Patent No. 1,726,151. After cooling it is preferred to dissolve the salt of chromium and the other admixtures in the requisite quantity of water to secure the degree of dilution desired, for subsequent additions of water alone may produce a turbidity or even a partial or complete precipitation of the product. This can however be avoided if both the mixture and the water to be added are both heated in advance, or if the water to be added contains a sufficient quantity of ammonia or alcohol or a mixture or both.

The resultant material can be used as a varnish or protective coating for surfaces or articles and its value enhanced if dried under pressure. Even without pressure it can be used as an acid-proof coating for various articles. If suitable pigments or dyes or finely divided solid material be added to the solution, the resultant mixture can be employed as a water soluble paint which becomes insoluble after application. Various organic or inorganic salts may also be added to the mixture (for instance casein, glue, aluminium powder) and even when such salts tend to cause precipitation this tendency can usually be overcome by the addition of alcohol or ammonia or a mixture of both or of some suitable fixed or volatile neutralizing agent.

I claim:—

1. A process of making a non-sticking water-soluble condensation product of carbolic acid and formaldehyde which consists in condensing a mixture of carbolic acid and formaldehyde by boiling the said mixture in the presence of an alkali salt diluting the said mixture with water while it is still boiling, cooling the diluted mixture and subsequently adding a further quantity of water containing salt of chromium.

2. A process of making a non-sticking water soluble condensation product for impregnating an organic material by the reaction between carbolic acid and formaldehyde in the presence of an alkali salt which consists in making a mixture of said constituents and boiling the said mixture until the product has attained a predetermined degree of viscosity, diluting the boiling mixture with water, cooling the diluted mixture and then adding an aqueous solution of a salt of chromium.

3. A process of making a non-sticking water soluble condensation product according to claim 2 wherein the organic material is cellulose and wherein the said further quantity of water contains copper hydroxide, ammonium chromate and excess of ammonia.

EDWARD SIDNEY HOLE.